United States Patent
Stojanovski et al.

(10) Patent No.: US 10,149,272 B2
(45) Date of Patent: Dec. 4, 2018

(54) LOCATION INFORMATION FOR VOICE OVER WLAN EMERGENCY CALLING

(71) Applicant: INTEL IP CORPORATION, Santa Clara, CA (US)

(72) Inventors: Alexandre S. Stojanovski, Paris (FR); Ana Lucia A. Pinheiro, Hillsboro, OR (US); Muthaiah Venkatachalam, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/542,045

(22) PCT Filed: Sep. 30, 2015

(86) PCT No.: PCT/US2015/053279
§ 371 (c)(1),
(2) Date: Jul. 6, 2017

(87) PCT Pub. No.: WO2016/160058
PCT Pub. Date: Oct. 6, 2016

(65) Prior Publication Data
US 2017/0353942 A1 Dec. 7, 2017

Related U.S. Application Data

(60) Provisional application No. 62/139,361, filed on Mar. 27, 2015.

(51) Int. Cl.
*H04W 64/00* (2009.01)
*H04W 12/06* (2009.01)
(Continued)

(52) U.S. Cl.
CPC ......... *H04W 64/003* (2013.01); *H04L 63/061* (2013.01); *H04L 63/0892* (2013.01);
(Continued)

(58) Field of Classification Search
CPC ..... H04W 4/005; H04W 12/06; H04W 4/023; H04W 4/24; H04W 64/00
See application file for complete search history.

(56) References Cited

U.S. PATENT DOCUMENTS

| 8,442,479 B2 | 5/2013 | Bakker et al. |
| 2009/0207759 A1 | 8/2009 | Andreasen et al. |

(Continued)

FOREIGN PATENT DOCUMENTS

| EP | 3275218 A1 | 1/2018 |
| WO | 2014005652 | 1/2014 |

(Continued)

OTHER PUBLICATIONS

International Preliminary Report on Patentability received for International application No. PCT/US2015/053279 dated Oct. 3, 2017, 9 pages.

(Continued)

*Primary Examiner* — Diane Mizrahi
(74) *Attorney, Agent, or Firm* — Spectrum IP Law Group LLC

(57) ABSTRACT

Briefly, in accordance with one or more embodiments, user equipment (UE) comprises processing circuitry to connect to a network via an untrusted wireless local area network (WLAN) and determine a location of the UE to provide the location of the UE if a voice call is made by the UE via the untrusted WLAN. The UE provides the location of the UE to a Public-Safety Answering Point (PSAP) via one or more network nodes of the network via the untrusted WLAN.

16 Claims, 8 Drawing Sheets

(51) Int. Cl.
  *H04W 4/02* (2018.01)
  *H04W 4/22* (2009.01)
  *H04L 29/06* (2006.01)
  *H04W 12/02* (2009.01)
  *H04W 4/90* (2018.01)
  *H04W 84/12* (2009.01)

(52) U.S. Cl.
  CPC .............. *H04W 4/023* (2013.01); *H04W 4/22* (2013.01); *H04W 4/90* (2018.02); *H04W 12/02* (2013.01); *H04W 12/06* (2013.01); *H04W 84/12* (2013.01)

(56) References Cited

U.S. PATENT DOCUMENTS

| 2011/0188416 | A1 | 8/2011 | Faccin et al. | |
| 2014/0101726 | A1 | 4/2014 | Gupta et al. | |
| 2014/0134996 | A1* | 5/2014 | Barclay | H04W 24/08 455/422.1 |
| 2016/0345157 | A1* | 11/2016 | Barclay | H04W 24/08 |
| 2017/0135031 | A1* | 5/2017 | Buckley | H04B 1/3816 |

FOREIGN PATENT DOCUMENTS

| WO | 2016160058 | 9/2015 |
| WO | 2016/074748 A1 | 5/2016 |

OTHER PUBLICATIONS

PCT Search Report, PCT/US2015/053279, 5 pages, dated Jan. 12, 2016.

PCT Written Opinion, PCT/US2015/053279, 8 pages, dated Jan. 12, 2016.

Notification of Publication for CN Application No. 201580076667.2, dated Nov. 1, 2017, 4 pages.

Office Action received for Japanese Patent Application No. 2017-544716 dated Oct. 2, 2018, 6 pages including 2 pages of English translation.

Alcatel-Lucent, Alcatel-Lucent Shanghai Bell, "Introducation of the Support of Emergency services over WLAN access to EPC," Change request, Jul. 6-10, 2015, 12 pages, S2-152240, 3GPP, Dubrovnik, Croatia.

* cited by examiner

LOCATION INFORMATION FOR VOICE OVER WLAN EMERGENCY CALLING

CROSS-REFERENCE TO RELATED APPLICATIONS

This application claims priority under 35 U.S.C. § 371 to International Application No. PCT/US2015/053279 filed Sep. 30, 2015, entitled LOCATION INFORMATION FOR VOICE OVER WLAN EMERGENCY CALLING which claims the benefit of U.S. Provisional Application No. 62/139,361 filed Mar. 27, 2015. The entire disclosure(s) of these documents are incorporated by reference herein for all purposes.

BACKGROUND

With the development of wireless local area network (WLAN) integration with Evolved Packet Core (EPC) and the capabilities of Voice over WLAN, the support of emergency calls over WLAN becomes essential. During emergency calls, one important requirement is to be able to determine the location of the caller. Currently, determining the location of the caller using WLAN is able to be done for the case of a trusted WLAN access point. There is no current solution, however, for the case of an untrusted WLAN access point.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
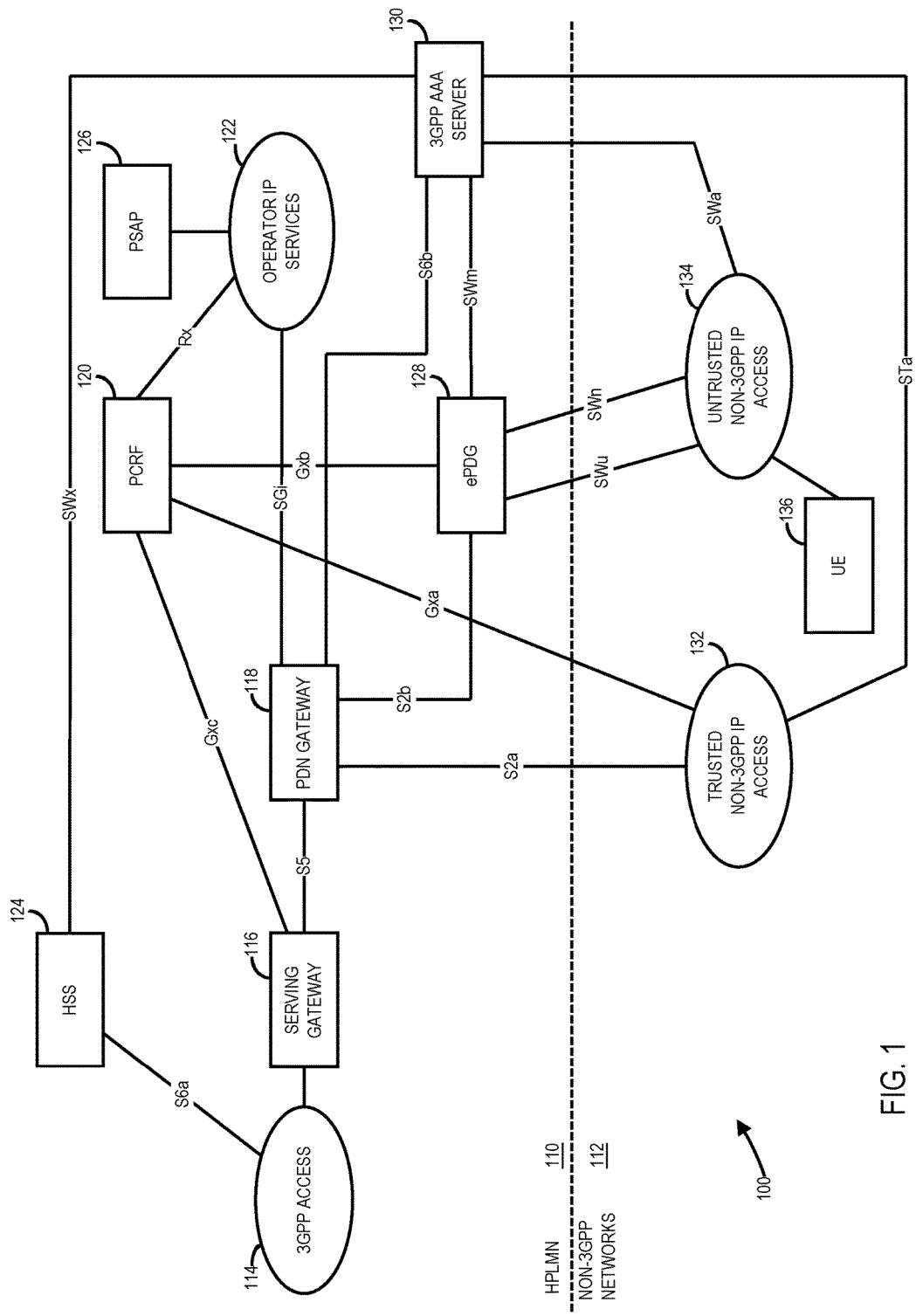
FIG. 1 is a diagram of an Evolved Packet Core (EPC) providing location information for a user equipment (UE) communicating using Voice over Wireless Local Area Network (VoWLAN) using an S2b interface in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an Evolved Packet Core (EPC) providing location information for a user equipment (UE) communicating using Voice over Wireless Local Area Network (VoWLAN) using an S2b interface in accordance with one or more embodiments will be discussed. As shown in FIG. 1, network 100 comprises an Evolved Packet Core (EPC) architecture that may operate in compliance with a Third Generation Partnership Project (3GPP) standard. Network 100 may comprise two portions, Home Public Land Mobile Network (HPLMN) 110 and non-3GPP networks 112. HPLMN 110 may comprise 3GPP access 114 which may include, for example, one or more evolved Node B (eNB) devices (not shown) to provide a radio access network (RAN). 3GPP Access 114 may couple to serving gateway (SGW) 116 coupled to Packet Data Network (PDN) Gateway (PGW) 118 via an S5 interface. Serving gateway 116 also may couple to Policy and Charging Rules Function (PCRF) 120 via a Gxc interface, and PCRF 120 in turn may couple to Operator Internet Protocol (IP) Services 122 via an Rx interface. Operator IP Services 122 may include, for example, IP Multimedia Subsystem (IMS) services, Packet-Switched Streaming (PSS) services, and so on. 3GPP Access 114 also may couple to Home Subscriber Server (HSS) 124 via S6a interface, which in turn coupled to 3GPP Authentication, Authorization, and Accounting (AAA) Server 130 via an SWx interface. PDN Gateway 118 couples to Operator IP Services 122 via an SGi interface, and to 3GPP AAA Server 130 via an S6b interface. PDN Gateway 118 also couples to an Evolved Packet Data Gateway (ePDG) 128 via an S2b interface. PCRF 120 couples to ePDG 128 via a Gxb interface. In turn ePDG 128 couples to 3GPP AAA Server 130 via an SWm interface.

The elements of HPLMN 110 provide a wireless wide area network (WWAN) connectivity for user equipment (UE) 136, for example via a cellular network provider. In one or more embodiments, HPLMN 110 may include Public-Safety Answering Point (PSAP) 126 to allow UE 136 to make emergency calls, for example to call for police, firefighting, and/or ambulance services. As part of providing PSAP 126 services, HPLMN 110 may determine a location of UE 110 via handset location techniques. In some embodiments, however, network 100 may also include 3GPP networks 112 that allow UE 136 to couple to network 100 via non-3GPP access technologies, for example via Wireless-Fidelity (Wi-Fi) that provides wireless local area network (WLAN) access. In such non-3GPP networks, Trusted Non-3GPP IP Access Point 132 may couple to PDN Gateway 118 via an S2a interface and may couple to PCRF 120 via Gxa interface. Trusted Non-3GPP IP Access Point also may couple to 3GPP AAA Server 130 via an STa interface. Alternatively, an Untrusted Non-3GPP IP Access Point 134 coupled to ePDG 128 via SWu interface and SWn interface, and couples to 3GPP AAA Server 130 via SWa interface. UE 136 is able to make voice calls over network 100, for example using a Voice over Wireless LAN (VoWLAN) standard, by communicating with either Trusted Non-3GPP IP Access Point 132 or Untrusted Non-3GPP IP Access Point 134. If UE 132 makes an emergency call when coupled with Untrusted Non-3GPP IP Access Point 134, network 100 is capable of determining the location of UE 136 as discussed herein, for example to provide the location of UE 136 to PSAP 126 so that emergency responders may be dispatched to the location of UE 136 to render emergency services. A method to determine the location of UE 136 when UE 136 makes a voice call via Untrusted Non-3GPP IP Access Point 134 is shown in and described with respect to FIG. 2, below.

Figure 2:
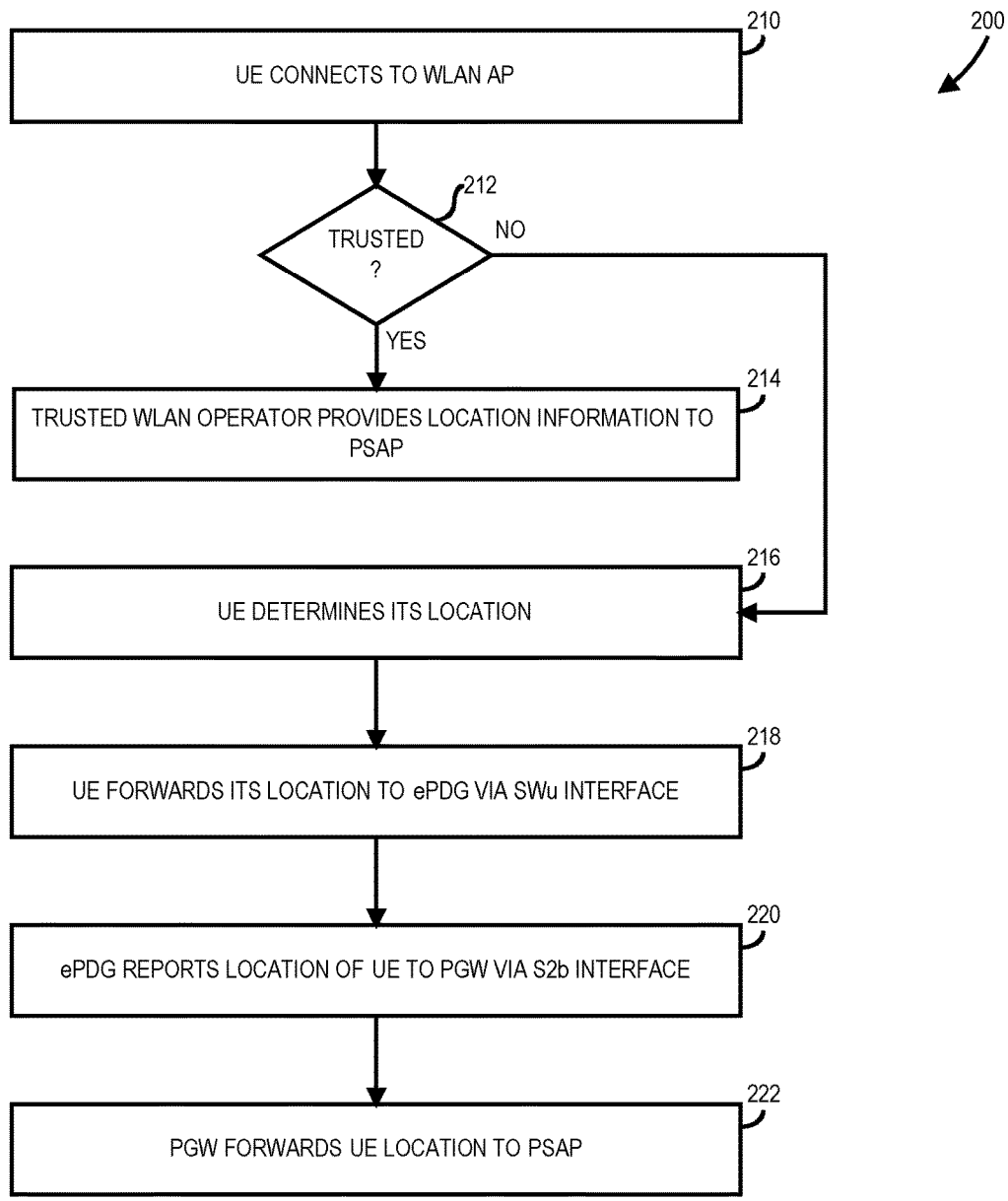
FIG. 2 is a flow diagram of a method to determine a location of a user equipment (UE) communicating using Voice over Wireless Local Area Network (VoWLAN) in the Evolved Packet Core (EPC) of FIG. 1 in accordance with one or more embodiments.

Referring now to FIG. 2, a flow diagram of a method to determine a location of a user equipment (UE) communicating using Voice over Wireless Local Area Network (VoWLAN) in the Evolved Packet Core (EPC) of FIG. 1 in accordance with one or more embodiments will be discussed. FIG. 2 illustrates one particular order and number of the operations of method 200, whereas in other embodiments method 200 may include more of fewer operations in various other orders, and the scope of the claimed subject matter is not limited in these respects. At block 210 UE 136 connects to a WLAN Access Point (AP). A determination may be made at block 212 whether the WLAN AP is trusted or not. If the WLAN AP is trusted, for example Trusted Non-3GPP IP Access Point 132, then the trusted WLAN AP operator provides location information for UE 136 to PSAP 126 at block 214. If the WLAN AP is no trusted, for example Untrusted Non-3GPP IP Access Point 134, then UE 136 determines its location at block 216 using one or more techniques as described herein. UE 218 forwards its location to ePDG 128 via an SWu interface at block 218. In turn, ePDG reports the location of UE 136 to PDN Gateway (PGW) 118 via S2b interface. At block 222, PDN Gateway (PGW) 118 then forwards the location of UE 136 to PSAP 122, for example via SGi interface through Operator IP Services 130.

In one or more embodiments, UE 136 may determine its location at block 216 using any one or more of the following techniques. In one embodiment, UE 136 may be configured to utilize a Dynamic Host Configuration Protocol (DHCP) protocol in order to obtain the civic address or geographic coordinates associated with Untrusted Non-3GPP IP Access Point 134. The civic address or geographic coordinates may be obtained by using the Media Access Control (MAC) address of the Untrusted Non-3GPP IP Access Point 134 and existing functionality in accordance with a DHCP standard such as the Request for Comments (RFC) 4676 Dynamic Host Configuration Protocol (DHCPv4 and/or DHCPv6) Option for Civic Addresses Configuration Information and/or the RFC 6225: Dynamic Host Configuration Protocol Options for Coordinate-Based Location Configuration Information, although the scope of the claimed subject matter is not limited in these respects.

In another embodiment, UE 136 may query the National Emergency Address Database (NEAD) which the database that provides a correlation between the MAC address of Untrusted Non-3GPP IP Access Point 134 and a dispatchable location to which PSAP 126 may dispatch emergency services. In a further embodiment, UE 136 may utilize the cell identity (Cell ID) of the 3GPP cell of 3GPP Access 114 that provides coverage in the same area where UE 136 is located. In such an arrangement, UE 136 reads the broadcast channel in that cell to determine its Cell ID wherein the UE 136 is generally in the location of the 3GPP cell. In yet another embodiment, UE 136 may use a satellite location determination system such as the Global Positioning System (GPS) or the Global Navigation Satellite System (GNSS) to discover its own location. In yet a further embodiment, if UE 136 is not able to determine its own location or the location of Untrusted Non-3GPP IP Access Point 134, then UE 136 may provide the MAC address of Untrusted Non-3GPP IP Access Point 134 using the techniques as described, below. These techniques also may be utilized in addition to obtaining the cell identity of the local 3GPP cell.

Where UE 136 does not have its location, UE 136 may utilize the IKEv2 protocol such as described in RFC 5996: Internet Key Exchange Protocol Version 2 (IKEv2), and then UE 136 reports the location information via the SWu interface to ePDG 128. This may be accomplished by utilizing the "vendor ID payload", "Notify payload" and/or "Configuration payload" defined in RFC 5996. UE 136 may provide any location information that it is aware of, as explained above, for example the Cell ID of a 3GPP cell, geographic coordinates or civic address, or MAC address of Untrusted Non-3GPP IP Access Point 134. In turn, ePDG 128 reports the location of UE 136 via the S2b interface to PDN Gateway (PGW) 118. If the MAC address of Untrusted Non-3GPP IP Access Point 134 is received, ePDG 128 either may utilize the MAC address of Untrusted Non-3GPP IP Access Point 134 to determine the location of Untrusted Non-3GPP IP Access Point 134 by querying the NEAD database. Optionally, ePDG can relay the MAC address on to PDN Gateway (PGW) 118. This may be accomplished, for example, by reutilizing the Information Element (IE) User Location Information (ULI) from the General Packet Radio Service (GPRS) Tunneling Control (GTP-Control) protocol. The ULI is an extendible IE that may be coded as shown in Table 1, below.

TABLE 1

User Location Information IE

| Octets | Bits 8 | 7 | 6 | 5 | 4 | 3 | 2 | 1 |
|---|---|---|---|---|---|---|---|---|
| 1 | Type = 86 (decimal) | | | | | | | |
| 2 to 3 | Length = n | | | | | | | |
| 4 | Spare | | | | | | | Instance |
| 5 | Spare | LAI | ECGI | TAI | RAI | SAI | CGI | |
| a to a + 6 | CGI | | | | | | | |
| b to b + 6 | SAI | | | | | | | |
| c to c + 6 | RAI | | | | | | | |
| d to d + 4 | TAI | | | | | | | |
| e to e + 6 | ECGI | | | | | | | |
| f to f + 4 | LAI | | | | | | | |
| g to (n + 4) | These octet(s) is/are present only if explicitly specified | | | | | | | |

As another option, a Trusted WLAN (TWAN) identifier IE used for trusted WLAN access networks may be extended to also be used in an untrusted case with Untrusted Non-3GPP IP Access Point 134. The TWAN identifier IE may be populated to indicate the location information of Untrusted Non-3GPP IP Access Point 134 as shown in Table 2, below.

TABLE 2

TWAN Identifier

| Octets | Bits 8 | 7 | 6 | 5 | 4 | 3 | 2 | 1 |
|---|---|---|---|---|---|---|---|---|
| 1 | Type = 169 (decimal) | | | | | | | |
| 2 to 3 | Length = n | | | | | | | |
| 4 | Spare | | | | | | | Instance |
| 5 | Spare | LAII | OPNAI | PLMNI | CIVAI | BSSIDI | | |
| 6 | SSID Length | | | | | | | |
| 7 to k | SSID | | | | | | | |
| (k + 1) to (k + 6) | BSSID | | | | | | | |
| q | Civic Address Length | | | | | | | |
| (q + 1) to (q + r) | Civic Address Information | | | | | | | |
| s to (s + 3) | TWAN PLMN-ID | | | | | | | |
| t | TWAN Operator Name Length | | | | | | | |
| (t + 1) to (t + u) | TWAN Operator Name | | | | | | | |
| v | Relay Identity Type | | | | | | | |
| (v + 1) | Relay Identity Length | | | | | | | |
| (v + 2) to (v + w) | Relay Identity | | | | | | | |
| x | Circuit-ID Length | | | | | | | |
| (x + 1) to (x + y) | Circuit-ID | | | | | | | |
| p to (n + 4) | These octet(s) is/are present only if explicitly specified | | | | | | | |

It should be noted that in some embodiments method 200 of FIG. 2 may be implemented as code or instructions stored in an article of manufacture comprising a non-transitory storage medium such as electronic memory wherein the code or instructions are capable of causing a processor, logic, or other circuitry to execute the method, in whole or in part, although the scope of the claimed subject matter is not limited in these respects. An example of such processors and memory devices comprising non-transitory storage media are shown in and described with respect to FIG. 6, below. Furthermore, similar reporting techniques for the location of UE 136 as the one described, above, also may be utilized in an S2c interface of network 100 as shown in and described with respect to FIG. 3, below.

Figure 3:
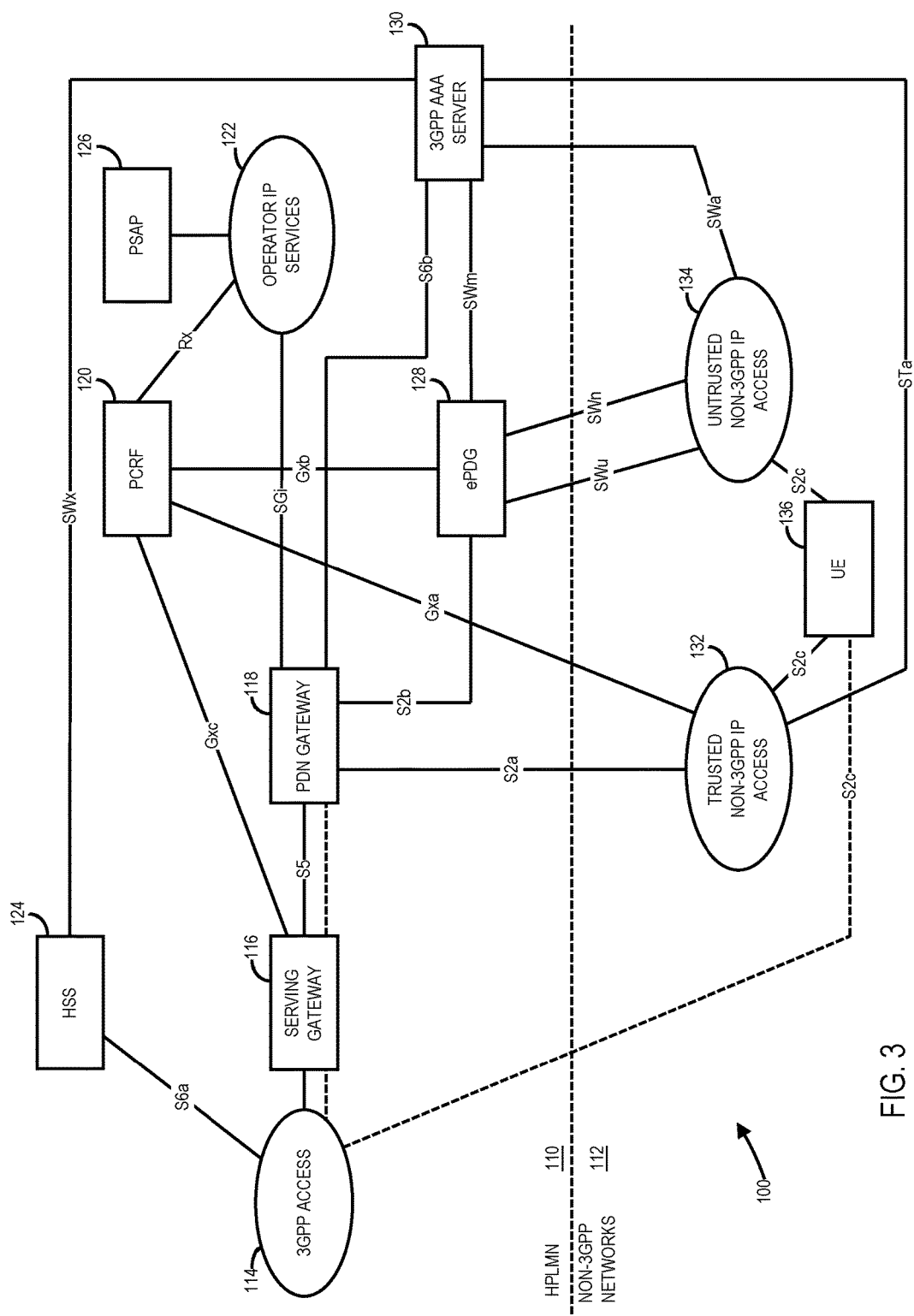
FIG. 3 is a diagram of an Evolved Packet Core (EPC) providing location information for a user equipment (UE) communicating using Voice over Wireless Local Area Network (VoWLAN) using an S2c interface in accordance with one or more embodiments.

Referring now to FIG. 3, a diagram of an Evolved Packet Core (EPC) providing location information for a user equipment (UE) communicating using Voice over Wireless Local Area Network (VoWLAN) using an S2c interface in accordance with one or more embodiments will be discussed. Network 100 of FIG. 3 is substantially similar to network 100 of FIG. 1 except that in FIG. 3 network utilizes an S2c interface to provide the location of UE 136 instead of an S2b interface as shown in FIG. 1. In the architecture of S2c network 100 of FIG. 2, UE 136 may have a Dual Stack Mobile IP (DSMIPv6) client that communicates with Home Agent (HA) functionality collocated with the PDN Gateway (PGW) 118. DSMIPv6 also utilizes IKEv2 signaling to establish a secure association between UE and PDN Gateway (PGW) 118. Location reporting of the location of UE 136 using an S2c interface may involves the following two processes. First, UE 136 obtains its location using techniques as discussed with respect to FIG. 2, above, such as DHCP options, using a Cell ID, using the MAC address of Untrusted Non-3GPP IP Access Point 134, and so on. Next, UE 136 uses IKEv2 signaling, for example using a "vendor ID payload", "Notify payload" and/or "Configuration payload" as defined in RFC 5996, to report the location of UE 136 to PDN Gateway (PGW) 118. If the location information includes the MAC address of Untrusted Non-3GPP IP Access Point 134, PDN Gateway (PGW) 118 may use the MAC address to query the NEAD database. In some embodiments, specific to the case where Extendible Authentication Protocol-Authentication and Key Agreement (EAP-AKA) or EAP-AKA prime (EAP-AKA') authentication is used for WLAN access authentication, the location of Untrusted Non-3GPP IP Access Point 134 serving UE 136 may be provided to 3GPP AAA Server 130 via the SWa interface as part of EAP-AKA (or EAP-AKA') signaling, for example within the EAP-Response/AKA-Challenge message payload or within the EAP-Response/AKA'-Challenge message payload. The location information for UE 136 is made further available from 3GPP AAA Server 130 to ePDG 128 via an SWm interface, to PDN Gateway (PGW) 119 via S6b interface, or to HSS 124 via an SWx interface as part of existing SWm, S6b, or SWx procedures. It should be noted that determination of the location of UE 136 and the techniques to provide the location of UE 136 are discussed herein for purposes of example, and the scope of the claimed subject matter is not limited in these respects.

Figure 4:
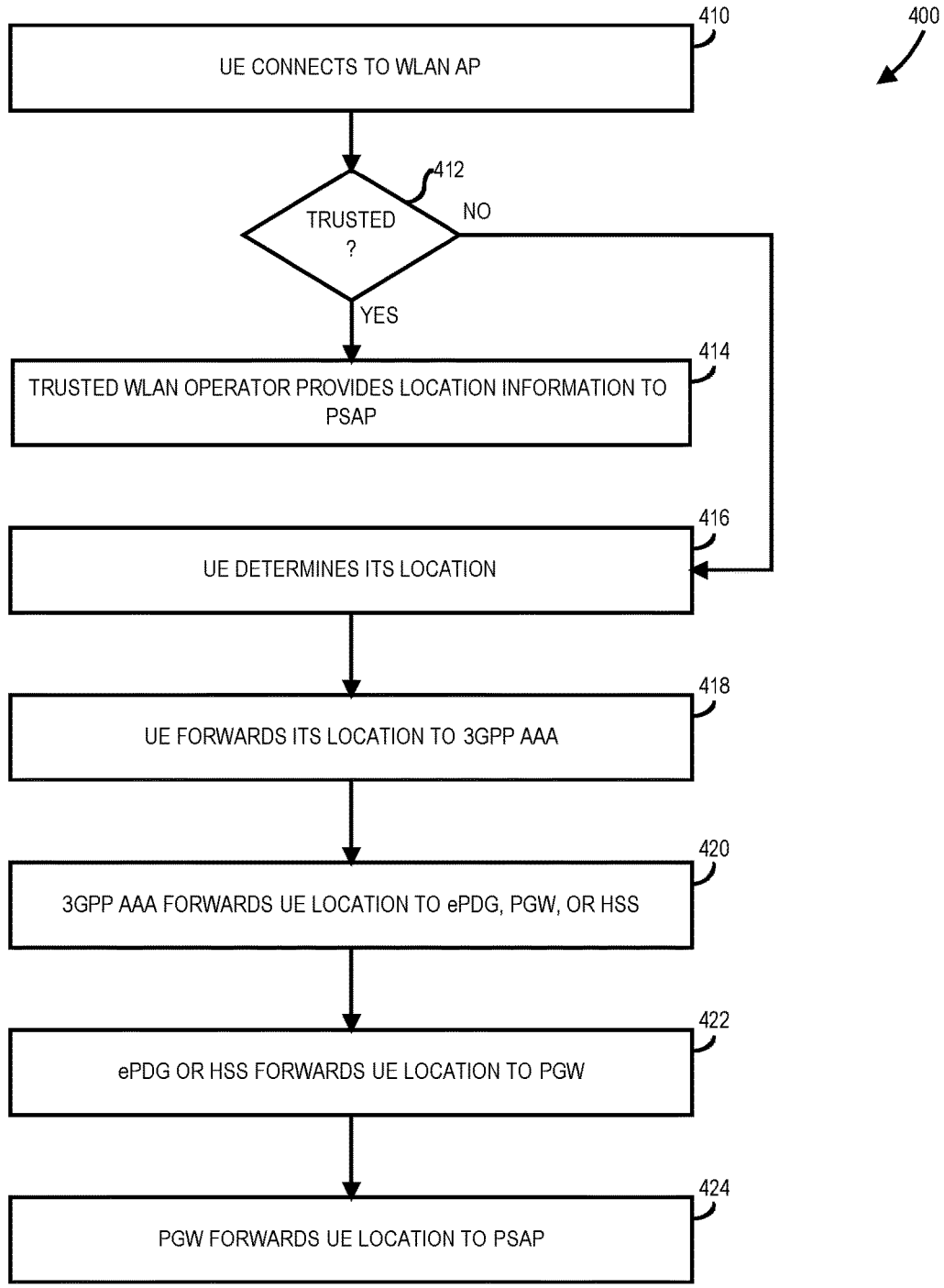
FIG. 4 is a flow diagram of a method to determine a location of a user equipment (UE) communicating using Voice over Wireless Local Area Network (VoWLAN) in the Evolved Packet Core (EPC) of FIG. 3 in accordance with one or more embodiments.

Referring now to FIG. 4, a flow diagram of a method to determine a location of a user equipment (UE) communicating using Voice over Wireless Local Area Network (VoW-LAN) in the Evolved Packet Core (EPC) of FIG. 3 in accordance with one or more embodiments will be discussed. FIG. 4 illustrates one particular order and number of the operations of method 400, whereas in other embodiments method 400 may include more of fewer operations in various other orders, and the scope of the claimed subject matter is not limited in these respects. In method 400, UE 136 connects to a WLAN AP at block 410 to make voice calls over network 100 via the WLAN AP. A determination is made at block 412 whether the WLAN AP is trusted. If the WLAN AP is trusted, the trusted WLAN operator is able to provide location information for UE 136 to PSAP 126 at block 414. If it is determined that the WLAN AP is not trusted, for example UE 136 is connected with Untrusted Non-3GPP IP Access Point 134, UE 136 determines its location at block 416, for example using techniques discussed herein. At block 418 UE 136 forwards its location to 3GPP AAA Server 130, and at block 420 3GPP AAA Server forwards the location of UE 136 to ePDG 128, PDN Gateway (PGW) 118, and/or to HSS 124. At block 422, ePDG 128 and/or HSS 124 forwards the location information for UE 136 to PDN Gateway (PGW) 118. At block 424, PDN Gateway (PGW) 118 forwards the location of UE 136 to PSAP 126. It should be noted that in some embodiments method 400 of FIG. 4 may be implemented as code or instructions stored in an article of manufacture comprising a non-transitory storage medium such as electronic memory wherein the code or instructions are capable of causing a processor, logic, or other circuitry to execute the method, in whole or in part, although the scope of the claimed subject matter is not limited in these respects. An example of such processors and memory devices comprising non-transitory storage media are shown in and described with respect to FIG. 6, below. An alternative method to determine a location of UE 136 is shown in and described with respect to FIG. 5, below.

Figure 5:
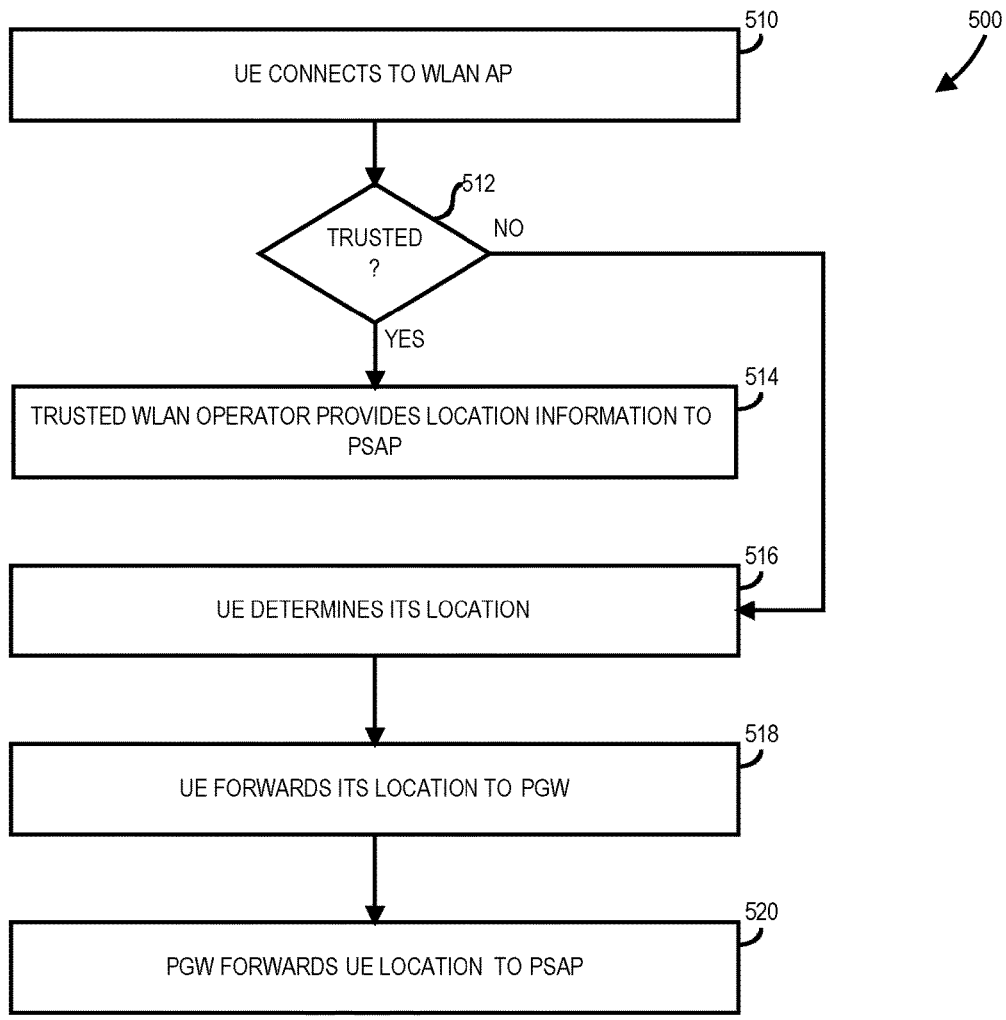
FIG. 5 is a flow diagram of an alternative method to determine a location of a user equipment (UE) communicating using Voice over Wireless Local Area Network (VoWLAN) in the Evolved Packet Core (EPC) of FIG. 3 in accordance with one or more embodiments.

Referring now to FIG. 5, a flow diagram of an alternative method to determine a location of a user equipment (UE) communicating using Voice over Wireless Local Area Network (VoWLAN) in the Evolved Packet Core (EPC) of FIG. 3 in accordance with one or more embodiments will be discussed. FIG. 5 illustrates one particular order and number of the operations of method 500, whereas in other embodiments method 500 may include more of fewer operations in various other orders, and the scope of the claimed subject matter is not limited in these respects. In method 500, UE 136 connects to a WLAN AP at block 510 to make voice calls over network 100 via the WLAN AP. A determination is made at block 512 whether the WLAN AP is trusted. If the WLAN AP is trusted, the trusted WLAN operator is able to provide location information for UE 136 to PSAP 126 at block 514. If it is determined that the WLAN AP is not trusted, for example UE 136 is connected with Untrusted Non-3GPP IP Access Point 134, UE 136 determines its location at block 516, for example using techniques discussed herein At block 518 UE 136 forwards its location to PDN Gateway (PGW) 518. At block 518, PDN Gateway (PGW) 518 forwards the location of UE 136 to PSAP 126. It should be noted that in some embodiments method 500 of FIG. 5 may be implemented as code or instructions stored in an article of manufacture comprising a non-transitory storage medium such as electronic memory wherein the code or instructions are capable of causing a processor, logic, or other circuitry to execute the method, in whole or in part, although the scope of the claimed subject matter is not limited in these respects. An example of such processors and memory devices comprising non-transitory storage media are shown in and described with respect to FIG. 6, below.

Figure 6:
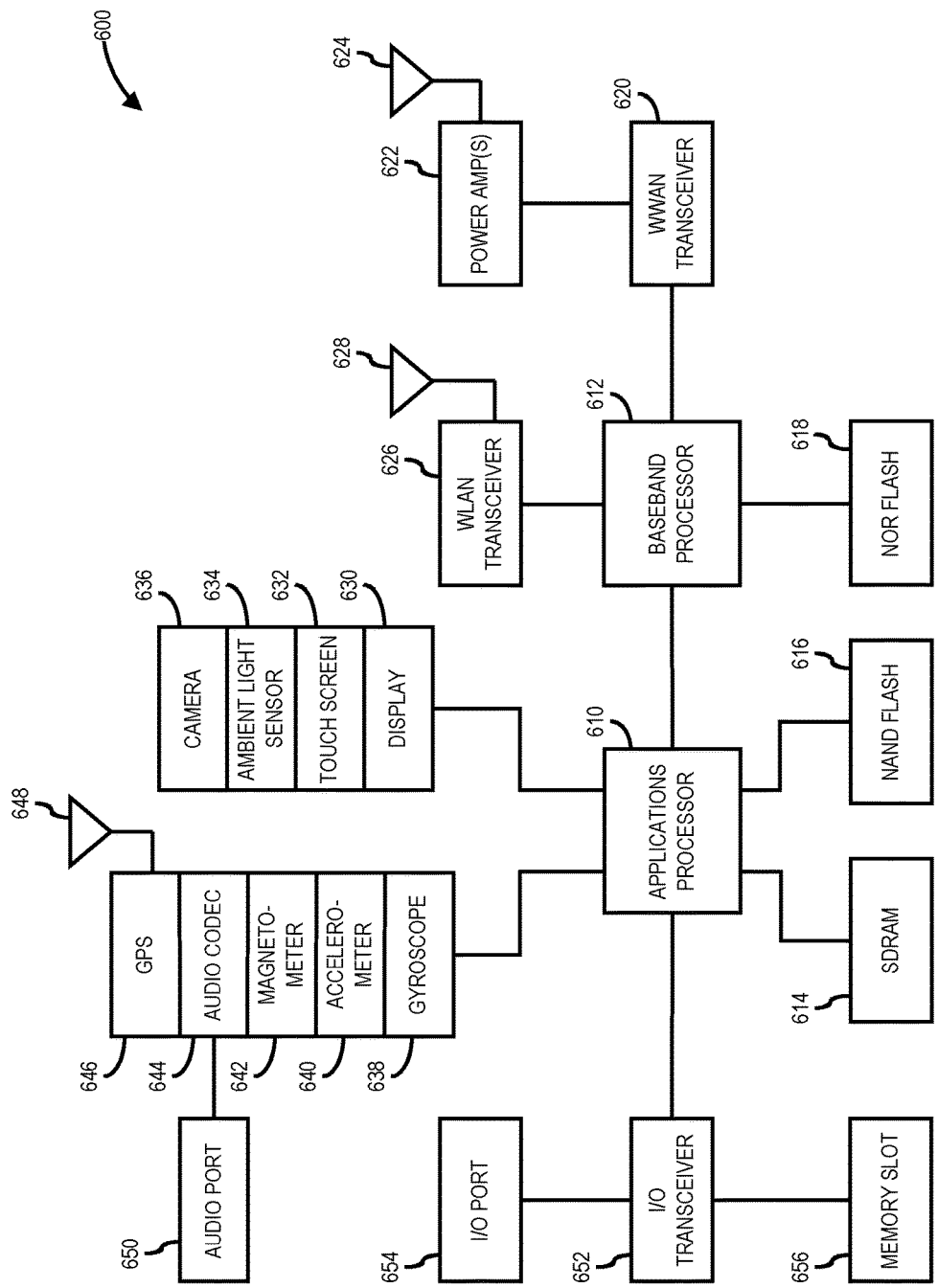
FIG. 6 is a block diagram of an information handling system capable of providing location information for Voice over WLAN emergency calling in accordance with one or more embodiments.

Referring now to FIG. 6, a block diagram of an information handling system capable of providing location information for Voice over WLAN emergency calling in accordance with one or more embodiments will be discussed. Information handling system 600 of FIG. 6 may tangibly embody any one or more of the network elements described herein, above, including for example the elements of network 100 of FIG. 1 or FIG. 2, with greater or fewer components depending on the hardware specifications of the particular device. Although information handling system 600 represents one example of several types of computing platforms, information handling system 600 may include more or fewer elements and/or different arrangements of elements than shown in FIG. 6, and the scope of the claimed subject matter is not limited in these respects.

In one or more embodiments, information handling system 600 may include an application processor 610 and a baseband processor 612. Application processor 610 may be utilized as a general-purpose processor to run applications and the various subsystems for information handling system 600. Application processor 610 may include a single core or alternatively may include multiple processing cores. One or more of the cores may comprise a digital signal processor or digital signal processing (DSP) core. Furthermore, application processor 610 may include a graphics processor or coprocessor disposed on the same chip, or alternatively a graphics processor coupled to application processor 610 may comprise a separate, discrete graphics chip. Application processor 610 may include on board memory such as cache memory, and further may be coupled to external memory devices such as synchronous dynamic random access memory (SDRAM) 614 for storing and/or executing applications during operation, and NAND flash 616 for storing applications and/or data even when information handling system 600 is powered off. In one or more embodiments, instructions to operate or configure the information handling system 600 and/or any of its components or subsystems to operate in a manner as described herein may be stored on an article of manufacture comprising a non-transitory storage medium. In one or more embodiments, the storage medium may comprise any of the memory devices shown in and described herein, although the scope of the claimed subject matter is not limited in this respect. Baseband processor 612 may control the broadband radio functions for information handling system 600. Baseband processor 612 may store code for controlling such broadband radio functions in a NOR flash 618. Baseband processor 612 controls a wireless wide area network (WWAN) transceiver 620 which is used for modulating and/or demodulating broadband network signals, for example for communicating via a 3GPP LTE or LTE-Advanced network or the like.

In general, WWAN transceiver 620 may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 12), 3GPP Rel. 14 (3rd Generation Partnership Project Release 12), 3GPP LTE Extra, LTE Licensed-Assisted Access (LAA), UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, millimeter wave (mm-Wave) standards in general for wireless systems operating at 10-90 GHz and above such as WiGig, IEEE 802.11ad, IEEE 802.11ay, and so on, and/or general telemetry transceivers, and in general any type of RF circuit or RFI sensitive circuit. It should be noted that such standards may evolve over time, and/or new standards may be promulgated, and the scope of the claimed subject matter is not limited in this respect.

The WWAN transceiver 620 couples to one or more power amps 642 respectively coupled to one or more antennas 624 for sending and receiving radio-frequency signals via the WWAN broadband network. The baseband processor 612 also may control a wireless local area network (WLAN) transceiver 626 coupled to one or more suitable antennas 628 and which may be capable of communicating via a Wi-Fi, Bluetooth®, and/or an amplitude modulation (AM) or frequency modulation (FM) radio standard including an IEEE 802.11 a/b/g/n standard or the like. It should be noted that these are merely example implementations for application processor 610 and baseband processor 612, and the scope of the claimed subject matter is not limited in these respects. For example, any one or more of SDRAM 614, NAND flash 616 and/or NOR flash 618 may comprise other types of memory technology such as magnetic memory, chalcogenide memory, phase change memory, or ovonic memory, and the scope of the claimed subject matter is not limited in this respect.

In one or more embodiments, application processor 610 may drive a display 630 for displaying various information or data, and may further receive touch input from a user via a touch screen 632 for example via a finger or a stylus. An ambient light sensor 634 may be utilized to detect an amount of ambient light in which information handling system 600 is operating, for example to control a brightness or contrast value for display 630 as a function of the intensity of ambient light detected by ambient light sensor 634. One or more cameras 636 may be utilized to capture images that are processed by application processor 610 and/or at least temporarily stored in NAND flash 616. Furthermore, application processor may couple to a gyroscope 638, accelerometer 640, magnetometer 642, audio coder/decoder (CODEC) 644, and/or global positioning system (GPS) controller 646 coupled to an appropriate GPS antenna 648, for detection of various environmental properties including location, movement, and/or orientation of information handling system 600. Alternatively, controller 646 may comprise a Global Navigation Satellite System (GNSS) controller. Audio CODEC 644 may be coupled to one or more audio ports 650 to provide microphone input and speaker outputs either via internal devices and/or via external devices coupled to information handling system via the audio ports 650, for example via a headphone and microphone jack. In addition, application processor 610 may couple to one or more input/output (I/O) transceivers 652 to couple to one or more I/O ports 654 such as a universal serial bus (USB) port, a high-definition multimedia interface (HDMI) port, a serial port, and so on. Furthermore, one or more of the I/O transceivers 652 may couple to one or more memory slots 656 for optional removable memory such as secure digital (SD) card or a subscriber identity module (SIM) card, although the scope of the claimed subject matter is not limited in these respects.

Figure 7:
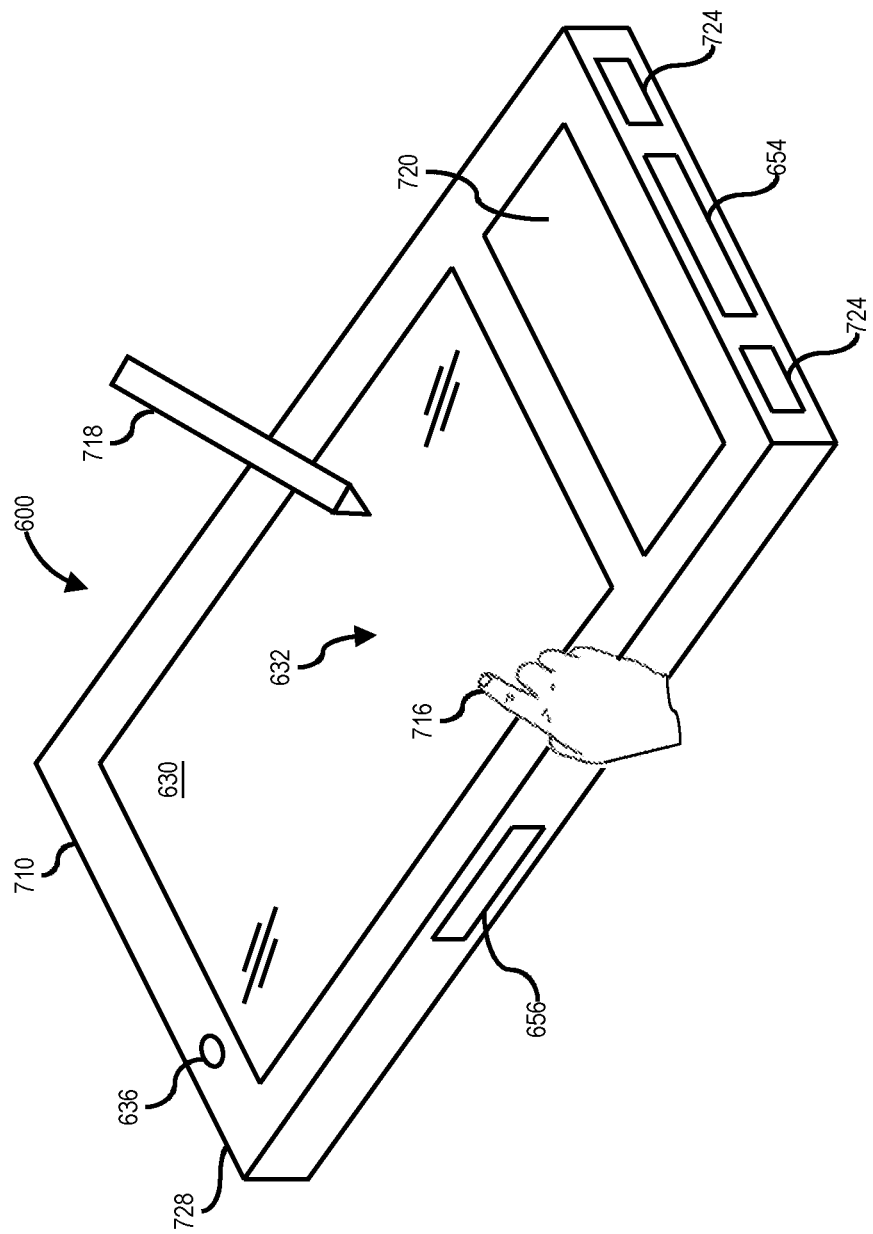
FIG. 7 is an isometric view of an information handling system of FIG. 6 that optionally may include a touch screen in accordance with one or more embodiments.

Referring now to FIG. 7, an isometric view of an information handling system of FIG. 6 that optionally may include a touch screen in accordance with one or more embodiments will be discussed. FIG. 7 shows an example implementation of information handling system 600 of FIG. 6 tangibly embodied as a cellular telephone, smartphone, or tablet type device or the like. The information handling system 600 may comprise a housing 710 having a display 630 which may include a touch screen 632 for receiving tactile input control and commands via a finger 716 of a user and/or a via stylus 718 to control one or more application processors 610. The housing 710 may house one or more components of information handling system 600, for example one or more application processors 610, one or more of SDRAM 614, NAND flash 616, NOR flash 618, baseband processor 612, and/or WWAN transceiver 620. The information handling system 600 further may optionally include a physical actuator area 620 which may comprise a keyboard or buttons for controlling information handling system via one or more buttons or switches. The information handling system 600 may also include a memory port or slot 656 for receiving non-volatile memory such as flash memory, for example in the form of a secure digital (SD) card or a subscriber identity module (SIM) card. Optionally, the information handling system 600 may further include one or more speakers and/or microphones 724 and a connection port 654 for connecting the information handling system 600 to another electronic device, dock, display, battery charger, and so on. In addition, information handling system 600 may include a headphone or speaker jack 728 and one or more cameras 636 on one or more sides of the housing 710. It should be noted that the information handling system 600 of FIG. 7 may include more or fewer elements than shown, in various arrangements, and the scope of the claimed subject matter is not limited in this respect.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 8:
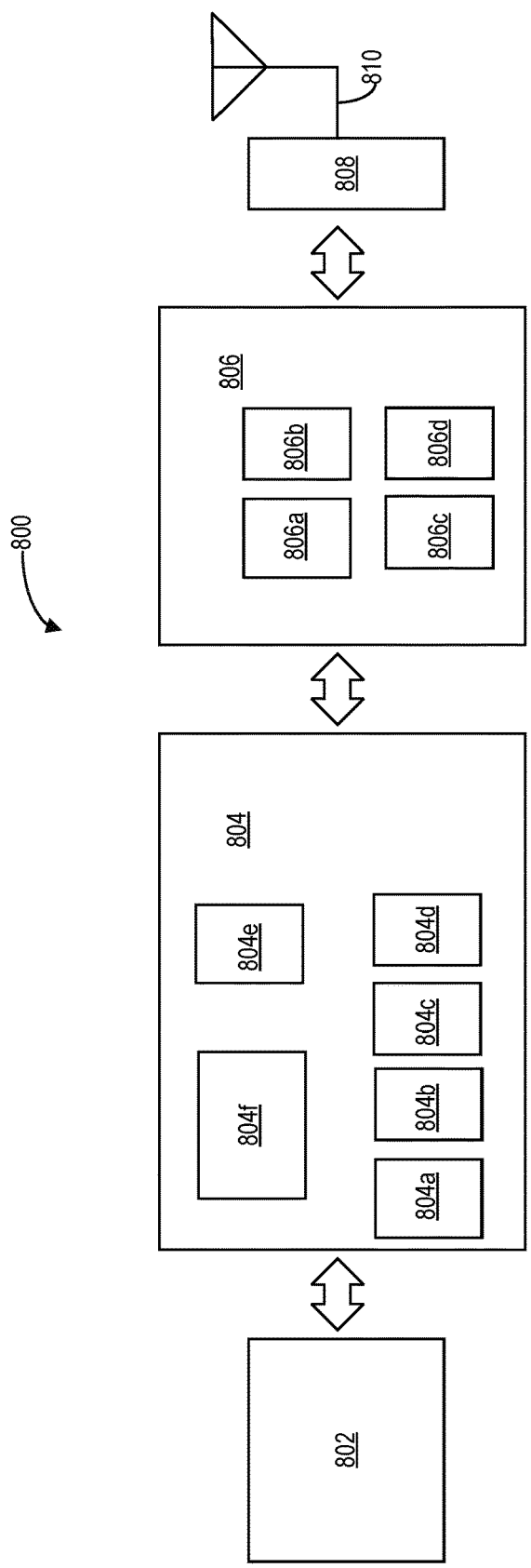
FIG. 8 is a diagram of example components of a wireless device in accordance with one or more embodiments.

Referring now to FIG. 8, example components of a wireless device such as User Equipment (UE) device 800 in accordance with one or more embodiments will be discussed. User equipment (UE) may correspond, for example, to UE 136 of FIG. 1 and FIG. 3, although the scope of the claimed subject matter is not limited in this respect. In some embodiments, UE device 800 may include application circuitry 802, baseband circuitry 804, Radio Frequency (RF) circuitry 806, front-end module (FEM) circuitry 908 and one or more antennas 810, coupled together at least as shown.

Application circuitry 802 may include one or more application processors. For example, application circuitry 802 may include circuitry such as, but not limited to, one or more single-core or multi-core processors. The one or more processors may include any combination of general-purpose processors and dedicated processors, for example graphics processors, application processors, and so on. The processors may be coupled with and/or may include memory and/or storage and may be configured to execute instructions stored in the memory and/or storage to enable various applications and/or operating systems to run on the system.

Baseband circuitry 804 may include circuitry such as, but not limited to, one or more single-core or multi-core processors. Baseband circuitry 804 may include one or more baseband processors and/or control logic to process baseband signals received from a receive signal path of RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or one or more other baseband processors 804d for other existing generations, generations in development or to be developed in the future, for example fifth generation (5G), sixth generation (6G), and so on. Baseband circuitry 804, for example one or more of baseband processors 804a through 804d, may handle various radio control functions that enable communication with one or more radio networks via RF circuitry 806. The radio control functions may include, but are not limited to, signal modulation and/or demodulation, encoding and/or decoding, radio frequency shifting, and so on. In some embodiments, modulation and/or demodulation circuitry of baseband circuitry 804 may include Fast-Fourier Transform (FFT), precoding, and/or constellation mapping and/or demapping functionality. In some embodiments, encoding and/or decoding circuitry of baseband circuitry 804 may include convolution, tail-biting convolution, turbo, Viterbi, and/or Low Density Parity Check (LDPC) encoder and/or decoder functionality. Embodiments of modulation and/or demodulation and encoder and/or decoder functionality are not limited to these examples and may include other suitable functionality in other embodiments.

In some embodiments, baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. Processor 804e of the baseband circuitry 804 may be configured to run elements of the protocol stack for signaling of the PHY, MAC, RLC, PDCP and/or RRC layers. In some embodiments, the baseband circuitry may include one or more audio digital signal processors (DSP) 804f. The one or more audio DSPs 804f may include elements for compression and/or decompression and/or echo cancellation and may include other suitable processing elements in other embodiments. Components of the baseband circuitry may be suitably combined in a single chip, a single chipset, or disposed on a same circuit board in some embodiments. In some embodiments, some or all of the constituent components of baseband circuitry 804 and application circuitry 802 may be implemented together such as, for example, on a system on a chip (SOC).

In some embodiments, baseband circuitry 804 may provide for communication compatible with one or more radio technologies. For example, in some embodiments, baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, RF circuitry 806 may include switches, filters, amplifiers, and so on, to facilitate the communication with the wireless network. RF circuitry 806 may include a receive signal path which may include circuitry to down-convert RF signals received from FEM circuitry 908 and provide baseband signals to baseband circuitry 804. RF circuitry 806 may also include a transmit signal path which may include circuitry to up-convert baseband signals provided by the baseband circuitry 904 and provide RF output signals to FEM circuitry 808 for transmission.

In some embodiments, RF circuitry 806 may include a receive signal path and a transmit signal path. The receive signal path of RF circuitry 806 may include mixer circuitry 806a, amplifier circuitry 806b and filter circuitry 806c. The transmit signal path of RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from FEM circuitry 808 based on the synthesized frequency provided by synthesizer circuitry 806d. Amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, mixer circuitry 806a of the transmit signal path may be configured to up-convert input baseband signals based on the synthesized frequency provided by synthesizer circuitry 806d to generate RF output signals for FEM circuitry 808. The baseband signals may be provided by the baseband circuitry 804 and may be filtered by filter circuitry 806c. Filter circuitry 806c may include a low-pass filter (LPF), although the scope of the embodiments is not limited in this respect.

In some embodiments, mixer circuitry 806a of the receive signal path and the mixer circuitry 806a of the transmit signal path may include two or more mixers and may be arranged for quadrature down conversion and/or up conversion respectively. In some embodiments, mixer circuitry 906a of the receive signal path and the mixer circuitry 806a of the transmit signal path may include two or more mixers and may be arranged for image rejection, for example Hartley image rejection. In some embodiments, mixer circuitry 806a of the receive signal path and the mixer circuitry 906a may be arranged for direct down conversion and/or direct up conversion, respectively. In some embodiments, mixer circuitry 806a of the receive signal path and mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, RF circuitry 806 may include analog-to-digital converter (ADC) and digital-to-analog converter (DAC) circuitry, and baseband circuitry 804 may include a digital baseband interface to communicate with RF circuitry 806. In some dual-mode embodiments, separate radio integrated circuit (IC) circuitry may be provided for processing signals for one or more spectra, although the scope of the embodiments is not limited in this respect.

In some embodiments, synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

Synthesizer circuitry 806d may be configured to synthesize an output frequency for use by mixer circuitry 806a of RF circuitry 806 based on a frequency input and a divider control input. In some embodiments, synthesizer circuitry 806d may be a fractional N/N+1 synthesizer.

In some embodiments, frequency input may be provided by a voltage controlled oscillator (VCO), although that is not a requirement. Divider control input may be provided by either baseband circuitry 904 or applications processor 802 depending on the desired output frequency. In some embodiments, a divider control input (e.g., N) may be determined from a look-up table based on a channel indicated by applications processor 802.

Synthesizer circuitry 806d of RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1, for example based on a carry out, to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency, for example twice the carrier frequency, four times the carrier frequency, and so on, and used in conjunction with quadrature generator and divider circuitry to generate multiple signals at the carrier frequency with multiple different phases with respect to each other. In some embodiments, the output frequency may be a local oscillator (LO) frequency (fLO). In some embodiments, RF circuitry 906 may include an in-phase and quadrature (IQ) and/or polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by RF circuitry 806 for transmission by one or more of the one or more antennas 810.

In some embodiments, FEM circuitry 808 may include a transmit/receive (TX/RX) switch to switch between transmit mode and receive mode operation. FEM circuitry 808 may include a receive signal path and a transmit signal path. The receive signal path of FEM circuitry 808 may include a low-noise amplifier (LNA) to amplify received RF signals and to provide the amplified received RF signals as an output, for example to RF circuitry 806. The transmit signal path of FEM circuitry 908 may include a power amplifier (PA) to amplify input RF signals, for example provided by RF circuitry 806, and one or more filters to generate RF signals for subsequent transmission, for example by one or more of antennas 810. In some embodiments, UE device 800 may include additional elements such as, for example, memory and/or storage, display, camera, sensor, and/or input/output (I/O) interface, although the scope of the claimed subject matter is not limited in this respect.

In a first example embodiment, an apparatus comprises processing circuitry to connect to a network via an untrusted wireless local area network (WLAN), determine a location of a user equipment (UE) to provide the location of the UE if a voice call is made by the UE via the untrusted WLAN, and provide the location of the UE to a Public-Safety Answering Point (PSAP) via one or more network nodes of the network via the untrusted WLAN. The processing circuitry may be configured to determine the location of the UE using a Dynamic Host Configuration Protocol (DHCP) technique to determine a civic address or a coordinate location of the untrusted WLAN based at least in part on a Media Access Control (MAC) address of the untrusted WLAN. The processing circuitry may be configured to determine the location of the UE by querying a National Address Emergency Database (NEAD) to correlate a location of the untrusted WLAN and a dispatchable location based at least in part on a Media Access Control (MAC) address of the untrusted WLAN. The processing circuitry may be configured to determine the location of the UE by reading a broadcast channel of a nearby cell to determine a cell identifier (Cell ID), wherein the location of the UE may be a location of the cell based at least in part on the Cell ID. The processing circuitry may be configured to determine the location of the UE by using a satellite positing system to determine the location of the UE. If the UE is unable to determine its location, the processing circuitry may be configured to obtain identifying information of one or more nearby devices, and report identifying information to an Evolved Packet Data Gateway (ePDG), wherein the ePDG determines a location of the UE based at least in part on the identifying information. If the UE is unable to determine its location, the processing circuitry may be configured to obtain identifying information of one or more nearby devices, and report identifying information to an Evolved Packet Data Gateway (ePDG), wherein the ePDG is to forward the identifying information to a Packet Data Network Gateway (PGW), and the PGW is to determine a location of the UE based at least in part on the identifying information. The processing circuitry may be configured to provide the location of the UE to a Public-Safety Answering Point (PSAP) via an S2b interface or an S2c interface. The processing circuitry may be configured to provide the location of the UE to a Public-Safety Answering Point (PSAP) via an Internet Key Exchange Protocol Version 2 (IKEv2). The processing circuitry may be configured to provide the location of the UE to a Public-Safety Answering Point (PSAP) via a vendor ID payload, a notify payload, or a configuration payload.

In a second example embodiment, an apparatus comprises processing circuitry to connect to a network via an untrusted wireless local area network (WLAN), determine a location of a user equipment (UE) for providing the location of the UE if a voice call is made by the UE via the untrusted WLAN, and provide the location of the UE to an Authentication, Authorization, and Accounting (AAA) server via the untrusted WLAN. The processing circuitry may be configured to provide the location of the UE to the AAA server via an SWa interface. The AAA server forwards the location of the UE to an Evolved Packet Data Gateway (ePDG), a Packet Data Network Gateway (PGW), or a Home Subscriber Server (HSS), or a combination thereof, in response to receiving the location information from the UE. The processing circuitry may be configured to provide the location of the UE the AAA server via Extendible Authentication Protocol-Authentication and Key Agreement (EAP-AKA) signaling or EPA-AKA prime signaling.

In a third example, user equipment (UE) comprises processing circuitry to connect to a network via an untrusted wireless local area network (WLAN), determine a location of the UE for providing the location of the UE if a voice call is made by the UE via the untrusted WLAN, and provide the location of the UE to a Packet Data Network Gateway (PGW) via the untrusted WLAN. The PGW may forward the location of the UE to a Public-Safety Answering Point (PSAP) via an Authentication, Authorization, and Accounting (AAA) server.

In a fourth example, an article of manufacture comprising a non-transitory storage medium having instructions thereon that, if executed, result in connecting to a network via an untrusted wireless local area network (WLAN), determining a location of user equipment (UE) to provide the location of the UE if a voice call is made by the UE via the untrusted WLAN, and providing the location of the UE to a Public-Safety Answering Point (PSAP) via one or more network nodes of the network via the untrusted WLAN. The instructions may result in determining the location of the UE using a Dynamic Host Configuration Protocol (DHCP) technique to determine a civic address or a coordinate location of the untrusted WLAN based at least in part on a Media Access Control (MAC) address of the untrusted WLAN. The instructions may result in determining the location of the UE by querying a National Address Emergency Database (NEAD) to correlate a location of the untrusted WLAN and a dispatchable location based at least in part on a Media Access Control (MAC) address of the untrusted WLAN. The instructions may result in determining the location of the UE by reading a broadcast channel of a nearby cell to determine a cell identifier (Cell ID), wherein the location of the UE may be a location of the cell based at least in part on the Cell ID. The instructions may result in determining the location of the UE by using a satellite positing system to determine the location of the UE. If the location of the UE is unable to be determined, the instructions, if executed, further result in obtaining identifying information of one or more nearby devices, and reporting identifying information to an Evolved Packet Data Gateway (ePDG), wherein the ePDG determines a location of the UE based at least in part on the identifying information. If the location of the UE is unable to be determined, the instructions, if executed, further may result in obtaining identifying information of one or more nearby devices, and reporting identifying information to an Evolved Packet Data Gateway (ePDG), wherein the ePDG forwards the identifying information to a Packet Data Network Gateway (PGW), and the PGW determines a location of the UE based at least in part on the identifying information. The instructions may result in providing the location of the UE to a Public-Safety Answering Point (PSAP) via an S2b interface or an S2c interface. The instructions may result in providing the location of the UE to a Public-Safety Answering Point (PSAP) via an Internet Key Exchange Protocol Version 2 (IKEv2). The instructions may result in providing the location of the UE to a Public-Safety Answering Point (PSAP) via a vendor ID payload, a notify payload, or a configuration payload.

In a fifth example, an article of manufacture comprising a non-transitory storage medium having instructions thereon that, if executed, result in connecting to a network via an untrusted wireless local area network (WLAN), determining a location of the UE for providing the location of the UE if a voice call is made by the UE via the untrusted WLAN, and providing the location of the UE to an Authentication, Authorization, and Accounting (AAA) server via the untrusted WLAN. The instructions may result in providing the location of the UE to the AAA server via an SWa interface. The AAA server may forward the location of the UE to an Evolved Packet Data Gateway (ePDG), a Packet Data Network Gateway (PGW), or a Home Subscriber Server (HSS), or a combination thereof, in response to receiving the location information from the UE. The instructions may result in providing the location of the UE the AAA server via Extendible Authentication Protocol-Authentication and Key Agreement (EAP-AKA) signaling or EPA-AKA prime signaling.

In a fifth example, an article of manufacture comprising a non-transitory storage medium having instructions thereon that, if executed, result in connecting to a network via an untrusted wireless local area network (WLAN), determining a location of the UE for providing the location of the UE if a voice call is made by the UE via the untrusted WLAN, and providing the location of the UE to a Packet Data Network Gateway (PGW) via the untrusted WLAN. The PGW may forward the location of the UE to a Public-Safety Answering Point (PSAP) via an Authentication, Authorization, and Accounting (AAA) server.

Although the claimed subject matter has been described with a certain degree of particularity, it should be recognized that elements thereof may be altered by persons skilled in the art without departing from the spirit and/or scope of claimed subject matter. It is believed that the subject matter pertaining to location information for Voice over WLAN emergency calling and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a Third Generation Partnership Project (3GPP) Authentication, Authorization, and Accounting (AAA) server, comprising:
    one or more processors to obtain wireless local area network (WLAN) Location Information for a WLAN Access Point (AP) via an Authentication and Authorization process for a user equipment (UE) associated with the WLAN AP, and to process a WLAN Location Information Request from an evolved Packet Data Gateway (ePDG) to generate a WLAN Location Answer containing the WLAN Location Information for the ePDG; and
    a memory coupled to the one or more processors to store the WLAN Location Information;
    wherein the WLAN AP is an untrusted access point.

2. The apparatus of claim 1, wherein the Authentication and Authorization process comprises an Extensible Authentication Protocol-Authentication Key Agreement (EAP-AKA) authentication process.

3. The apparatus of claim 1, wherein the Authentication and Authorization process is based at least in part on Universal Subscriber Identity Module (USIM) credentials.

4. The apparatus of claim 1, wherein the one or more processors are to generate the WLAN Location Answer during an SWm session between the 3GPP AAA server and the ePDG.

5. One or more non-transitory machine-readable media having instructions thereon that, when executed by a Third Generation Partnership Project (3GPP) Authentication, Authorization, and Accounting (AAA) server, result in:
    obtaining wireless local area network (WLAN) Location Information for a WLAN Access Point (AP) via an Authentication and Authorization process for a user equipment (UE) associated with the WLAN AP;
    storing the WLAN Location Information in a memory;
    processing a WLAN Location Information Request from an evolved Packet Data Gateway (ePDG); and
    generating a WLAN Location Answer containing the WLAN Location Information for the ePDG;
    wherein the WLAN AP is an untrusted access point.

6. The one or more non-transitory machine-readable media of claim 5, wherein the Authentication and Authorization process comprises an Extensible Authentication Protocol-Authentication Key Agreement (EAP-AKA) authentication process.

7. The one or more non-transitory machine-readable media of claim 5, wherein the Authentication and Authorization process is based at least in part on Universal Subscriber Identity Module (USIM) credentials.

8. The one or more non-transitory machine-readable media of claim 5, wherein the instructions, when executed, further result in generating the WLAN Location Answer during an SWm session between the 3GPP AAA server and the ePDG.

9. An apparatus of an evolved Packet Data Gateway (ePDG), comprising:
    one or more processors to generate a wireless local area network (WLAN) Location Information Request for a Third Generation Partnership Project (3GPP) Authentication, Authorization, and Accounting (AAA) server to obtain WLAN Location Information for a WLAN Access Point (AP) from the 3GPP AAA server, and to process a WLAN Location Answer containing the WLAN Location Information from the 3GPP AAA sever; and
    a memory coupled to the one or more processors to store the WLAN Location Information;
    wherein the WLAN AP is an untrusted access point.

10. The apparatus of claim 9, wherein the WLAN Location Information is obtained by the 3GPP AAA sever via an Extensible Authentication Protocol-Authentication Key Agreement (EAP-AKA) authentication process.

11. The apparatus of claim 9, wherein the WLAN Location Information is obtained by the 3GPP AAA sever via Universal Subscriber Identity Module (USIM) credentials.

12. The apparatus of claim 9, wherein the one or more processors are to generate the WLAN Location Information Request during an SWm session between the 3GPP AAA server and the ePDG.

13. One or more non-transitory machine-readable media having instructions thereon that, when executed by an evolved Packet Data Gateway (ePDG) result in:
    generating a wireless local area network (WLAN) Location Information Request for a Third Generation Partnership Project (3GPP) Authentication, Authorization, and Accounting (AAA) server to obtain WLAN Location Information for a WLAN Access Point (AP) from the 3GPP AAA server;
    processing a WLAN Location Answer containing the WLAN Location Information from the 3GPP AAA sever; and
    storing the WLAN Location Information in a memory;
    wherein the WLAN AP is an untrusted access point.

14. The one or more non-transitory machine-readable media of claim 13, wherein the WLAN Location Information is obtained by the 3GPP AAA sever via an Extensible Authentication Protocol-Authentication Key Agreement (EAP-AKA) authentication process.

15. The one or more non-transitory machine-readable media of claim 13, wherein the WLAN Location Information is obtained by the 3GPP AAA sever via Universal Subscriber Identity Module (USIM) credentials.

16. The one or more non-transitory machine-readable media of claim 13, wherein the instructions, when executed, further result in generating the WLAN Location Information Request during an SWm session between the 3GPP AAA server and the ePDG.

* * * * *